United States Patent [19]

Pann

[11] Patent Number: 4,464,737

[45] Date of Patent: Aug. 7, 1984

[54] METHOD FOR MIGRATION OF SEISMIC REFLECTION WAVES

[75] Inventor: Keh Pann, Richardson, Tex.

[73] Assignee: Mobil Oil Corporation, New York, N.Y.

[21] Appl. No.: 306,254

[22] Filed: Sep. 28, 1981

[51] Int. Cl.³ ............................................. G01V 1/28
[52] U.S. Cl. ........................................ 367/49; 367/63
[58] Field of Search ...................... 367/41, 43, 53, 73, 367/74, 59, 63, 88, 49

[56] References Cited

PUBLICATIONS

Schultz et al., "Depth Migration Before Stack", Geophysics, vol. 45, No. 3, Mar. 1980, pp. 376–393.
Judson et al., "Depth Migration After Stack", Geophysics, vol. 45, No. 3, Mar. 1980, pp. 361, 373–375.
Amalendu Roy, "Convergence in Downward Continuation for Some Simple Geometries", Geophysics, vol. 32, No. 5, Oct. 1967, pp. 853–871.
Rohde et al., "Migration of Time Contour Mays Using Downward Continuation", Technical Papers, Fiftieth Annual International Meeting and Exposition, Society of Exploration Geophysicists, 1980, pp. 337–373.

*Primary Examiner*—Maynard R. Wilbur
*Assistant Examiner*—K. R. Kaiser
*Attorney, Agent, or Firm*—A. J. McKillop; Michael G. Gilman; George W. Hager, Jr.

[57] ABSTRACT

In seismic exploration a seismic source transmits seismic energy into the earth and seismic detectors record the seismic waves returning to the earth's surface from reflecting subsurface interfaces. The downgoing transmitted seismic energy and the upcoming reflected seismic waves are transformed into the frequency domain, downward continued, and summed to produce a migrated seismic depth section.

2 Claims, 8 Drawing Figures

METHOD FOR MIGRATION OF SEISMIC REFLECTION WAVES

BACKGROUND OF THE INVENTION

This invention relates to a method of determining the presence and location of seismic reflections from the earth's subsurface formations.

In seismic exploration, seismic energy is generated at a shotpoint at or near the surface of the earth, is reflected from subsurface interfaces between layers of the earth, and is received by a spread of geophones on the surface of the earth. The geophone signals are recorded in the form of a seismic record section. This seismic time section contains information which can be used to represent the characteristics of the subsurface formations.

Primary reflection signals on the seismic record section indicate the presence of a subsurface reflecting interface, and time occurances of these primary reflection signals represent the depth of the reflecting interface from the earth's surface. Furthermore, the time-shift or attitude of a primary reflection from trace-to-trace indicates the dip or slope of the subsurface interface.

Skilled seismic interpreters can sometimes determine the location and dip of subsurface interfaces directly from the seismic record section. However, this requires a large amount of judgment due to various distortions introduced into the record section. Such distortions may take the form of multiples, ghosts, reverberations, ground roll, shot noise, etc. Another type of distortion is from the physical phenomena, commonly known as migration. Such migration distortion is introduced by assuming that the reflection events come from a subsurface interface directly below the receiver and have been displayed on the record section as though this were the case. The impedance discontinuity producing the reflection is commonly termed the "reflector surface" and its apparent orientation on a record section is commonly termed the "record surface". The two surfaces as illustrated in FIGS. 1 and 2 will coincide only when the reflector surface is flat and horizontal. Migration is, therefore, a process by which the reflector surface is constructed on the record section as illustrated in FIG. 3. This is carried out by picturing the reflection points A', B' and C' as being moved to an arc to A", B" and C" directly under the shotpoints A, B and C.

In a typical seismic data processing sequence, migration is preceded by conventional common-depth-point stacking. Even though a large fraction of data is processed in this way, there are data sets where the depth-point stack does not enhance all the reflecting events of interest. In areas of complex geometry, criss-cross events may not stack well. Also fault plane reflections are lost during the common-depth-point stack. Diffractions, which help delineate the termination of reflectors, are generaly not preserved during the common-depth-point stack. Further, conventional migration techniques are desinged to operate in a homogeneous medium and are not satisfactory for continuing a seismic wave field in a medium with lateral velocity variations.

It is therefore, an object of the present invention to apply a prestack migration operation in such a manner as to produce a migrated seismic record section which overcomes the difficulties inherent in conventional migration processing.

SUMMARY OF THE INVENTION

In accordance with the present invention, there is produced a migrated seismic depth section from seismic data, representing the occurance times of seismic energy from a plurality of spaced sources and reflected from subsurface interfaces. A source of seismic energy transmits seismic energy waves downward into the earth. Seismic energy detectors on the surface of the earth record the upcoming seismic energy waves reflected from subsurface interfaces. Both the known downgoing and the recorded upcoming seismic energy waves are Fourier transformed into the frequency domain. Each frequency component in both the downgoing and upcoming seismic energy waves are downward continued. All the downward continued frequency components of the product of upcoming wave and the complex conjugate of downgoing wave are summed to produce a migrated seismic record section representing the actual depth of the subsurface interfaces.

In a further aspect, the downward continuation of the frequency components of the downgoing and upcoming seismic energy waves employs a finite difference operation applied to the X-Z variables for the frequency components of said seismic energy waves.

In a still further aspect, the summation of the downward continued frequency components is carried out in accordance with arbitrary source-to-reciver imagery.

DESCRIPTION OF THE PREFERRED EMBODIMENT

Figure 1:
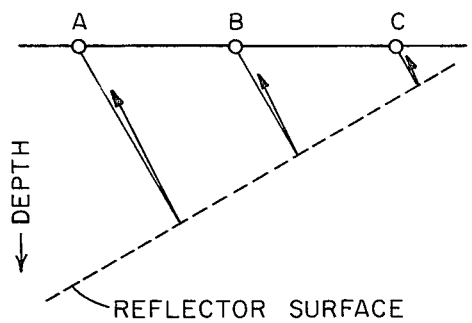
FIGS. 1-3 illustrate the known principle of migration of seismic reflection signals from subsurface interfaces.
Figure 2:
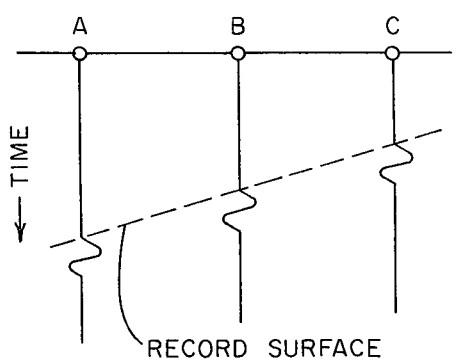
Figure 3:
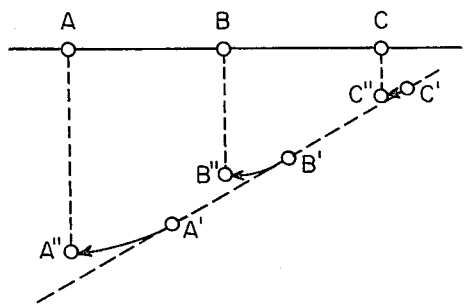
Figure 4:
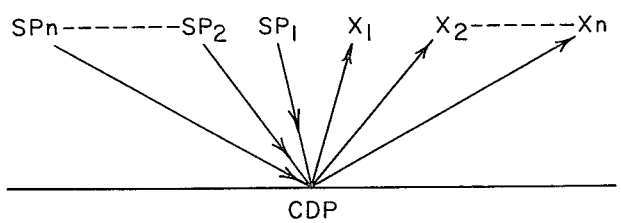
FIG. 4 illustrates a conventional seismic exploration technique.

Referring to FIG. 4, seismic energy, produced of each of a plurality of spaced shotpoints $SP_1$-$SP_n$, is reflected from a subsurface interface at a common-depth-point (CDP) and is received at a plurality of spaced locations $X_1$-$X_n$ for the production of a seismic time section. This seismic energy can be described as having two components, a source generated downgoing wave and a field recorded upcoming wave. Even though the source generated downgoing wave is never directly measured, the location and geometry of the source are known. Hence, the surface distribution of the amplitude of the downgoing wave can be estimated. When the velocity of the earth medium is known, both the measured upcoming wave and the estimated source generated downgoing wave can be downward continued to arbitrary depth. Downward continuation is a computation operation by which wave field at any depth level can be computed from a known field specified at a different level, in a manner consistent with the wave equation. The upcoming wave is generated at the moment when the downgoing wave is impinging on a subsurface reflector. Therefore, at the reflector, the upcoming wave and the downgoing wave exist simultaneously and their amplitude ratio is the reflector strength. Conversely, reflectors exist only where there are simultaneous arrivals of downgoing and upcoming waves, the ratio of their amplitudes being the reflector strength.

Figure 5:
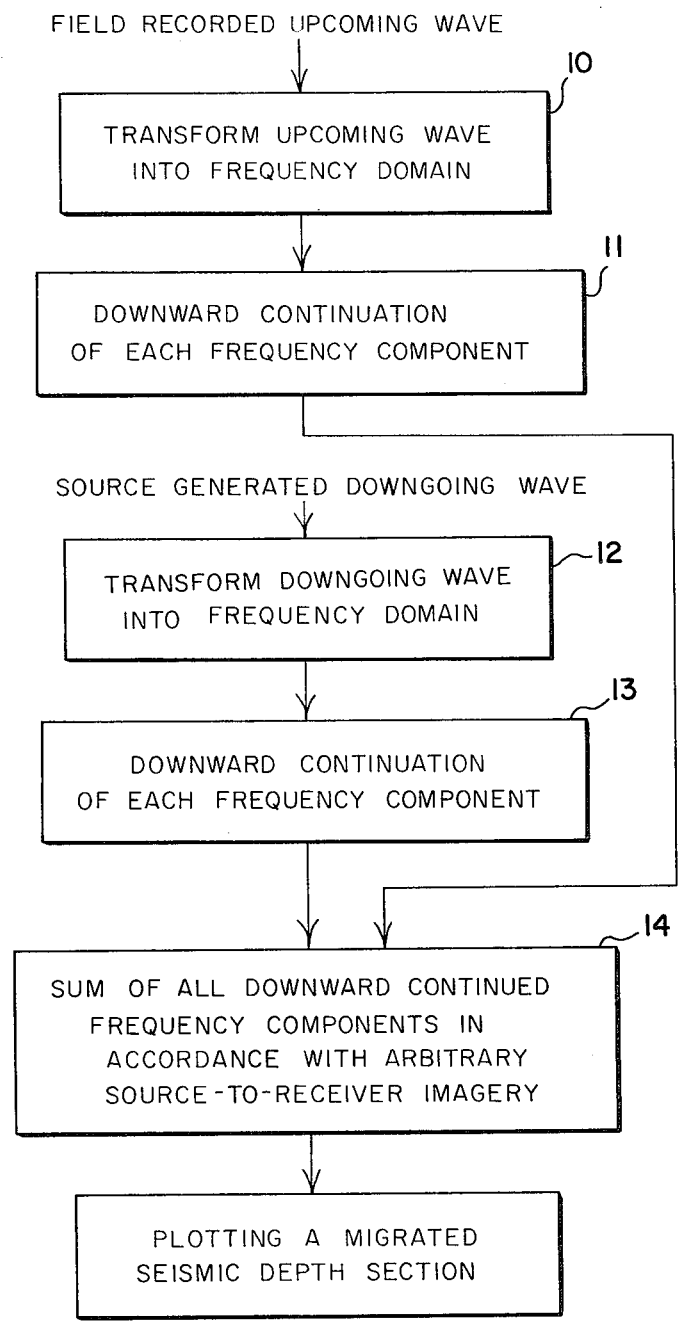
FIG. 5 is a flow sheet depicting the migration method of the present invention.

Referring now to FIG. 5, there is illustrated a flow diagram of the prestack migration operation of the present invention utilizing both the downgoing and upcoming components of the recording seismic signals. The field recorded upcoming wave is initially tranformed at step 10 into the frequency domain. This is carried out by applying the Fourier transform to the differential equation with respect to the time variable t and only the signal frequency band is kept. A finite difference operation is then applied to the X-Z variables for each of the kept frequency components. Such operation includes a split-step time-sharing finite difference algorithm for efficient computations.

More particularly, the downward continuation of upcoming wave is carried out in accordance with the following described expressions. From the upcoming wave measured on the surface $U_s(x,z=o, t)$, where s represents shot location, the upcoming wave over the whole depth is computed by use of the following total velocity gradient upcoming wave equation $$\frac{\partial^3 u}{\partial z \partial t^2} + \frac{3V}{4} \frac{\partial^3 U}{\partial t \partial x^2} - \frac{V^2}{4} \frac{\partial^3 U}{\partial z \partial x} - \frac{1}{V} \frac{\partial^3 U}{\partial t^3} = 0 \quad (1)$$

where V, the velocity of the earth medium may vary in both x, the lateral distance variable; and z, the depth variable. To accommodate for lateral velocity variations, a split-step algorithm is implemented in the frequency domain wherein equation (1) is split into two equations:

$$\omega^2 \frac{\partial \tilde{U}}{\partial z} + \frac{V^2}{4} \frac{\partial^3 \tilde{U}}{\partial z \partial x^2} - \frac{jV\omega}{2} \frac{\partial^2 \tilde{U}}{\partial x^2} = 0 \quad (2)$$

$$\text{and } \frac{\partial \tilde{U}}{\partial z} - \frac{j\omega}{V} \tilde{U} = 0 \quad (3)$$

$$\text{where } \tilde{U}_{(x,z,w)} = \int_a^a U(x,z,t) e^{-j\omega t} dt \quad (4)$$

Numerically, equation (2) is implemented with a Crank-Nicolson type finite difference scheme, and equation (3) is directly solved for each depth increment. For a more detailed discussion of splitting-up techniques, reference is made to Marchuk, G. I. (1975), *Methods of Numerical Mathematics*, Springer-Verlag and to Kjartansson, E. (1978), "Modeling and Migration with the Monochromatic Wave Equation—Variable Velocity and Attenuation", *Stanford Exploration Project* (Stanford, Calif.: Leland Stanford Junior University) Report No. 15.

In like manner, the source generated downgoing wave is initially transformed at step 12 into the frequency domain. The equation which governs the source generated downgoing wave in step 12 can be obtained from equations (1), (2), and (3) by changing the sign of variable z.

$$\omega^2 \frac{\partial \tilde{D}}{\partial z} + \frac{V^2}{4} \frac{\partial^3 \tilde{D}}{\partial z \partial x^2} + \frac{jV\omega}{2} \frac{\partial^2 \tilde{D}}{\partial x^2} = 0 \quad (5)$$

$$\frac{\partial \tilde{D}}{\partial z} + \frac{j\omega}{V} \tilde{D} = 0 \quad (6)$$

where $\tilde{D}(x,z,w)$ is the fourier transform of the downgoing wave field.

At step 11 each frequency component in the signal band for the upcoming wave is downward continued, while at step 13 each frequency component in the signal band for the downgoing wave is downward continued.

The relevant quantity in the frequency domain is not the downgoing wave itself, but rather the complex conjugate of it. Taking the complex conjugate of equations (5) and (6) from steps 10 and 12 the complex conjugate of the downgoing wave D satisfies the same equation which the upcoming wave U satisfies.

$$\omega^2 \frac{\partial \tilde{D}^*}{\partial z} + \frac{V^2}{4} \frac{\partial^3 \tilde{D}^*}{\partial z \partial x^2} - \frac{jV\omega}{2} \frac{\partial^2 \tilde{D}^*}{\partial x^2} = 0 \quad (7)$$

$$\frac{\partial \tilde{D}^*}{\partial z} - \frac{j\omega}{V} \tilde{D}^* = 0 \quad (8)$$

The operation of complex conjugation in the frequency domain corresponds to the time reversal in the time domain, and a time reversed downgoing wave will behave in every respect like an upcoming wave.

After $U(x,z,w)$ is thus computed at all depth levels, the migration process is finished by summing over the real part of the $D^*(x,z,w)U(x,z,w)$ for all the frequencies under consideration. This summing is carried out at step 14 in accordance with arbitrary source-to-receiver imagery:

$$U(x,z,t) \approx R(x,z) D(x,z,t), \quad (9)$$

where $R(x,z)$ is the reflector map to be estimated. Both $U(x,z,t)$ and $D(x,z,t)$ are time dependent wave fields whereas $R(x,z)$ is independent time. Thus, equation (9) for any instant of time provides a solution method for $R(x,z)$. However, to take advantage of the available $U(x,z,t)$ and $D(x,z,t)$ for all time, this overly redundant set of equations as described in equation (9) should be solved in a least squares manner:

$$\text{Minimize } [\int \infty_0 [U(x,z,t) - R(x,z)D(x,z,t)]^2 dt]. \quad (10)$$

$$\text{Then } D(x,z,t)[U(x,z,t) - R(x,z)D(x,z,t)]dt = 0. \quad (11)$$

From which it follows that $$R(x,z) = \frac{\int_o^\infty U(x,z,t)D(x,z,t)dt}{\int_o^\infty D(x,z,t)D(x,z,t)dt}. \quad (12)$$

In equation (11), the denominator behaves as a scaling factor. In the case of complex geology, it is possible that a certain region in depth is poorly illuminated by the downgoing wave, then equation (11) gives undesirable results. By ignoring the denominator, the following expression is adequate for summing the frequency components to form the arbitrary source-to-receiver imagery of step 14:

$$R(x,z) = \int_0^\infty U(x,z,t)D(x,z,t)dt \quad (13)$$

In the frequency domain, $$R(x,z) = \int_{-\infty}^{\infty} \tilde{U}(x,z,\omega)\tilde{D}^*(x,z,\omega)d\omega \quad (14)$$

$$= 2\int_0^\infty Re[\tilde{U}(x,z,\omega)\tilde{D}^*(x,z,\omega)]d\omega$$

Equation (13) shows that only $\tilde{D}^*$, not $\tilde{D}$ is used in imaging. Thus, only $\tilde{D}^*$, not $\tilde{D}$ needs to be computed in the downward continuation process. Equation (13) is implemented with a numerical summing over the discrete frequency components.

Figure 6:
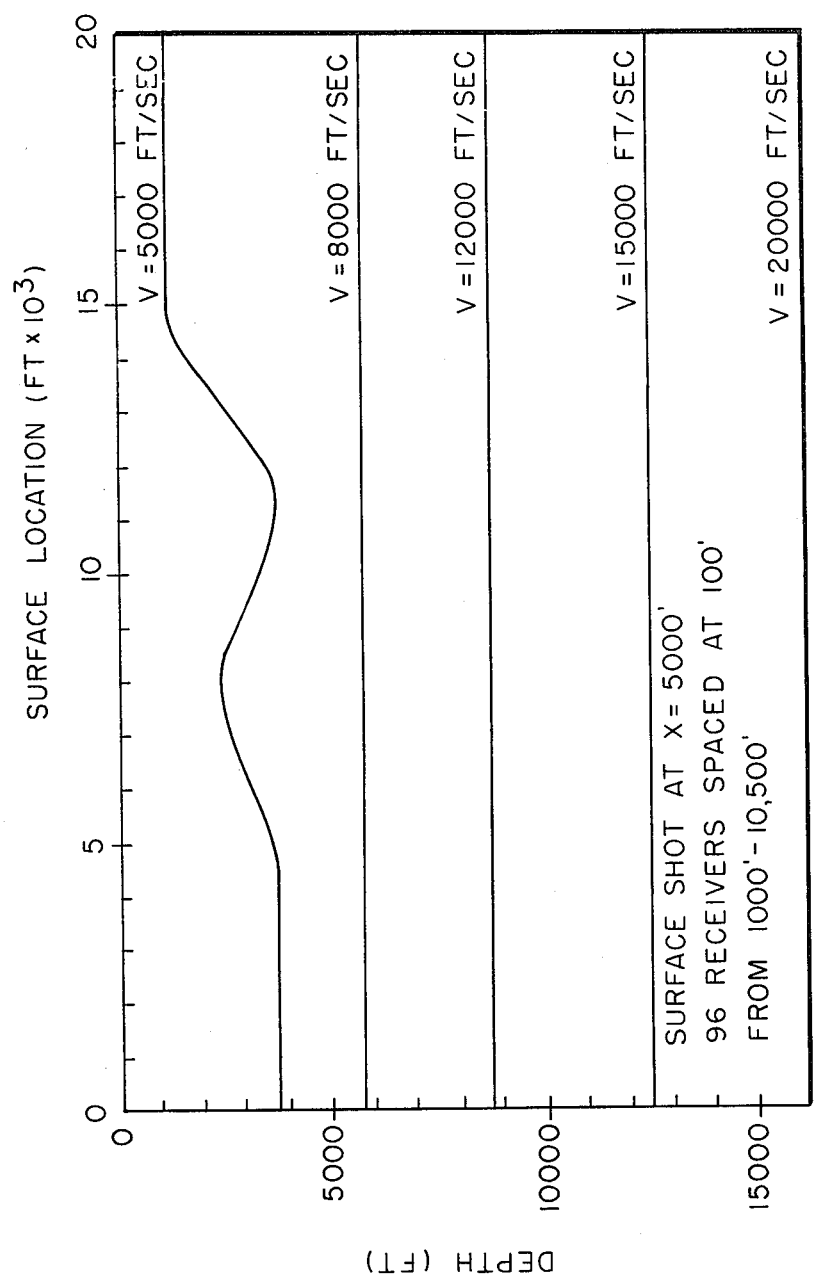
FIG. 6 is a water bottom model used to generate a common shot gather of seismic traces.
Figure 7:
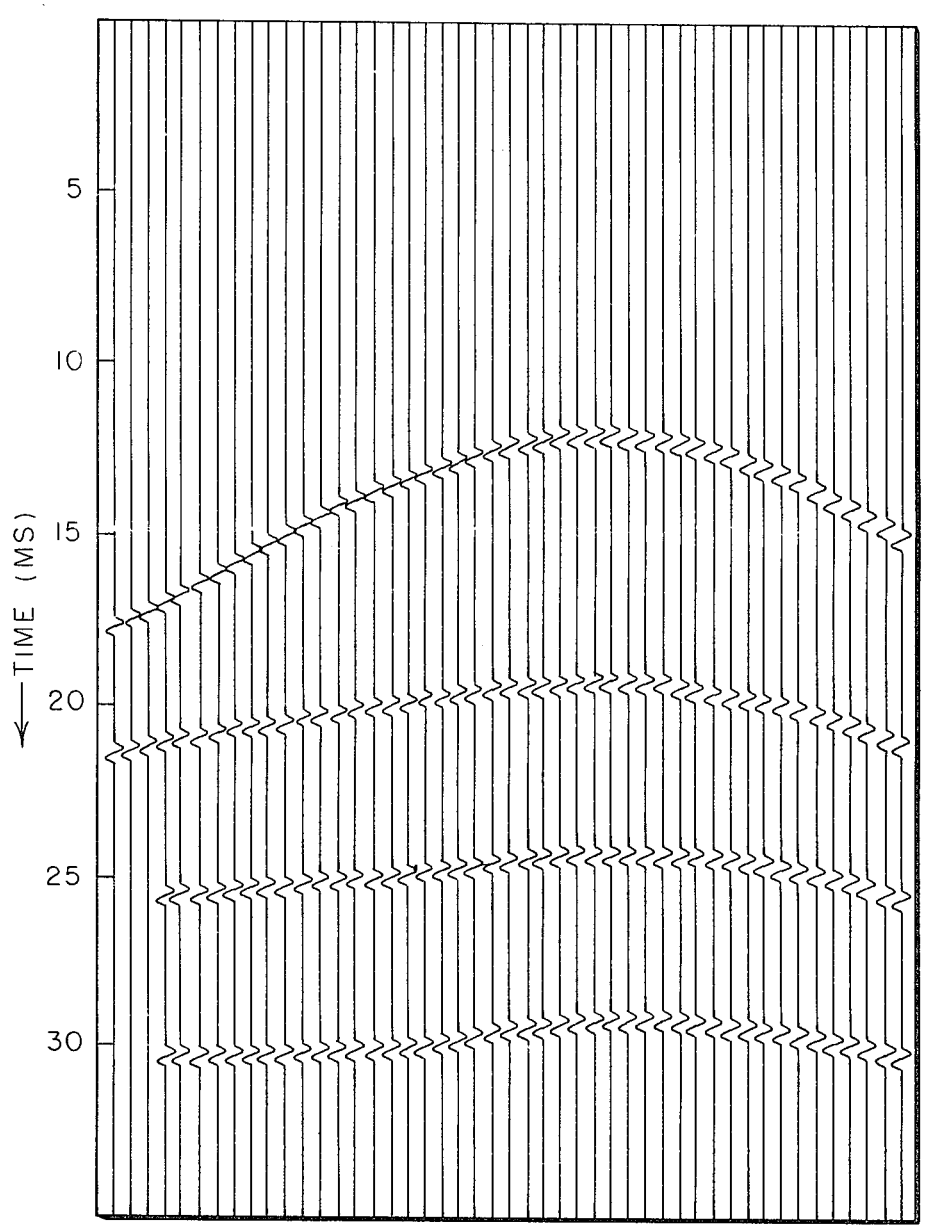
FIG. 7 is a seismic record section obtained from the water bottom model of FIG. 6 without migration processing enhancement.
Figure 8:
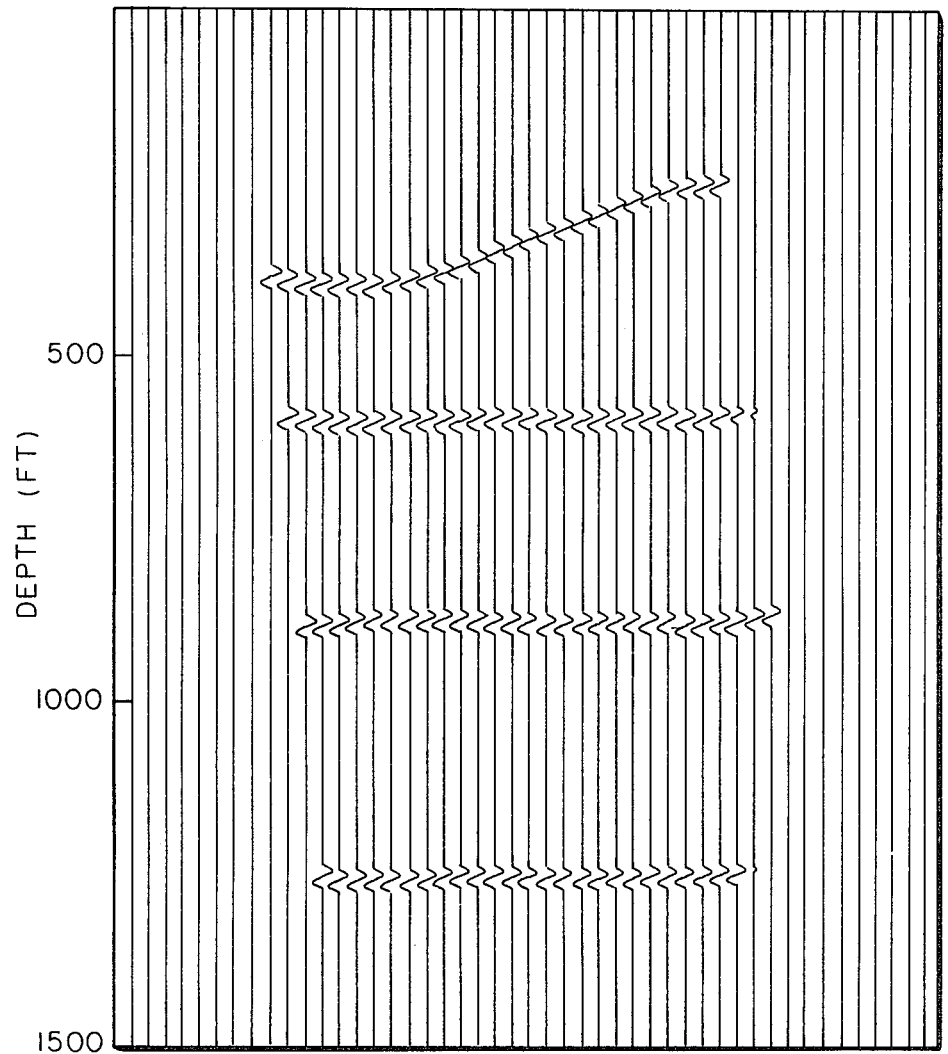
FIG. 8 is the seismic record section of FIG. 7 corrected in accordance with the migration enhancement method of FIG. 5.

To illustrate application of the foregoing described migration operation, reference is now made to FIGS. 6–8. A water bottom model which consists of an undulating water bottom overlying three flat reflectors, shown in FIG. 6, is used to generate a common shot gather of synthetic traces. The shot is located at x=5,000 ft. Ninety-six receiver locations, ranging from x=1,000 ft. to x=10,500 ft. are spaced at 100 ft. Based on ray tracing technique, this common shot gather of traces is generated and is shown in FIG. 7. The prestack migration of the present invention is then applied. The resulting depth section is shown in FIG. 8. All the flat reflectors are accurately mapped.

From the foregoing it will be apparent that the migration method of the present invention can be practiced either with the use of analog computing apparatus such as delay lines, shift registers, drum recorders, contour plotters, etc., or with the use of digital computing apparatus. In one particular embodiment of a digital computing system a Control Data Corporation Model 6600 General Purpose Digital Computer is utilized along with the following input/output components:

Control Computer, 65K Memory
6602 Console Display
6681 Data Channel Converter
405 Card Reader
3447 Card Reader Controller
501 Line Printer
3256 Line Printer Controller The foregoing has described the migration method of the present invention. It is to be understood that various modifications to the disclosed embodiment, as well as alternative embodiments, may become apparent to one skilled in the art without departing from the scope and spirit of the invention as hereinafter defined by the appended claims.

I claim:

1. A method for producing a migrated seismic depth section from seismic data representing the occurrence times of seismic energy from a plurality of spaced sources and reflected from subsurface interfaces, comprising;
   (a) providing a source of seismic energy for transmitting seismic energy waves downward into the earth,
   (b) computing the source generated downgoing seismic wave,
   (c) recording the upcoming seismic wave reflected from subsurface interfaces within the earth,
   (d) transforming said recorded downgoing wave into the frequency domain,
   (e) transforming said recorded upcoming wave into the frequency domain,
   (f) downward continuing each frequency component in the signal band for said downgoing wave,
   (g) downward continuing each frequency component in the signal band for said upcoming wave,
   (h) time reversing each downward continued frequency component of said downgoing wave,
   (i) summing all time reversed downward continued frequency components of said downgoing wave and all downward frequency components of said upcoming wave, and
   recording said summed frequency components to produce an arbitrary source-to-receiver migrated seismic section representing the actual depth of the subsurface interfaces.

2. The method of claim 1 wherein
   (a) the step of time reversing each downward continued frequency component of said downgoing wave comprises the taking of the complex conjugate component of each of said downward continued frequency components of said downgoing waves, and
   (b) the step of summing comprises the summing of the complex conjugate components of each of said downward continued frequency components of said downgoing waves and all of the downward continued frequency components of said upgoing waves.

* * * * *